United States Patent

Krock et al.

[15] 3,705,389

[45] Dec. 5, 1972

[54] DIGITAL COMPUTER HAVING A PLURALITY OF ACCUMULATOR REGISTERS

[72] Inventors: Alwin Krock, Zellhausen; Hans-Peter Page; Joachim Hirschmann, both of Seligenstadt, all of Germany

[73] Assignee: Licentia Patent-Verwaltungs-G.m.b.H., Frankfurt am Main, Germany

[22] Filed: July 14, 1971

[21] Appl. No.: 162,502

Related U.S. Application Data

[63] Continuation-in-part of Ser. No. 152,949, June 14, 1971, abandoned.

[30] Foreign Application Priority Data

June 12, 1970 Germany ....................P 20 28 931.0

[52] U.S. Cl. ..............................................340/172.5

[51] Int. Cl. ..............................................G06f 9/00

[58] Field of Search ....................340/172.5; 235/157

[56] References Cited

UNITED STATES PATENTS

| | | | |
|---|---|---|---|
| 3,166,668 | 1/1965 | Marsh | 340/172.5 |
| 3,626,374 | 12/1971 | Chinlund | 340/172.5 |
| 3,370,274 | 2/1968 | Kettley et al. | 340/172.5 |
| 3,594,732 | 7/1971 | Mendelson et al. | 340/172.5 |
| 3,461,433 | 8/1969 | Emerson | 340/172.5 |
| 3,465,296 | 9/1969 | Drage et al. | 340/172.5 |
| 2,916,210 | 12/1959 | Selmer | 340/172.5 |

*Primary Examiner*—Paul J. Henon
*Assistant Examiner*—Mark Edward Nusbaum
*Attorney*—Spencer & Kaye

[57] ABSTRACT

In a programmable digital computer containing a plurality of accumulator registers, an accumulator address register for placing one accumulator register or another into operation, a plurality of instruction counters and an instruction counter address register for selectively operating one instruction counter or another, an addition/subtraction circuit is provided for automatically adding or subtracting unity to the number in the accumlulator address register and/or the instruction counter address register in dependence on the contents of the address part of the program instruction words.

8 Claims, 8 Drawing Figures

DIGITAL COMPUTER HAVING A PLURALITY OF ACCUMULATOR REGISTERS

CROSS-REFERENCE TO RELATED APPLICATION

This application is a continuation-in-part application of Ser. No. 152,949 filed June 14th 1971, now abandoned, entitled Digital Computer Having A Plurality Of Accumulator Registers.

BACKGROUND OF THE INVENTION

The present invention relates to a digital computer having a plurality of accumulator registers, particularly a computer in which one accumulator register at a time is selected by an accumulator address register.

A program controlled digital computer generally contains a calculating mechanism for performing arithmetic and/or logic operations and a memory in which the data which has been read in as well as the results of calculations or other operations are stored. The memory consists of a plurality of locations containing the data and each location is identified by a number, which is referred to as its address. Such a computer is further provided with a control mechanism which causes the programmed instructions to be carried out by emitting control signals to the individual components of the machine.

Most computers have registers associated with the calculating mechanism to form therewith a unit known as an accumulator. The result from each arithmetic or logic operation is fed into such an accumulator. When this result is not used in a subsequent operation which employs the accumulator, the result must be transferred to locations of the memory before the accumulator can be released for a new operation.

Many of the arithmetic or logic operations for which the accumulator is used employ a first operand which must be stored in a register of the accumulator before the operation can begin and a second operand which, during the operation, goes into the calculating mechanism together with the first operand. In addition to the arithmetic or logic operations, a number of data transfer operations are therefore required and these act to reduce the operating speed of the computer, occupy additional locations in the memory and increase the expenditures for programming a machine. The same drawbacks also appear in connection with shift instructions which relate to the shifting of a number in a register by one or a plurality of bit positions, to the right or left and which require use of the accumulator.

A computer has become known which partly eliminates these drawbacks in that it permits the selective connection of one of a plurality of accumulator registers with a calculating mechanism. Such a computer is disclosed in British Pat. No. 826,613. With this known machine an instruction word contains an address part for the accumulator registers and an address part for the memory locations.

Another difficulty in preparing programs results from the necessity of determining, by means of a series of instructions, the traffic, i.e., the number of transfers, between primary and secondary programs. In addition to instructions for jumps into a secondary program and back into the main program, methods must be provided for supplying the secondary programs with data parameters.

SUMMARY OF THE INVENTION

It is the object of the present invention to improve computers of the above-mentioned type to cause a smaller number of instructions to be required in the programs which relate to the restoring of data.

Another object of the invention is to simplify the programming itself in such computers.

Yet another object of the invention is to increase the operating speed of such computers.

It is a further object of the present invention to provide a single-address computer having the above-mentioned characteristics.

These and other objects according to the present invention are achieved by connecting an accumulator address register, which selects an accumulator register for cooperation with a calculating mechanism having a memory for the calculating mechanism overflow, and an instruction counter address register, which selects one of a plurality of instruction counters, with an addition/subtraction circuit with which the content of the accumulator address register and/or the instruction counter address register can be reduced or increased by unity, or a count of one, in dependence on the contents of the command part of the program instruction words.

The system of the present invention for changing the content of the accumulator address register can be employed with particular advantage in conjunction with arithmetic and logic instructions. This is accomplished during the performance of an operation, such as an addition, for example, by increasing or decreasing the content of the accumulator address register by a count of one. The content of the accumulator address register before the beginning of the respective operation indicates which accumulator register is to be controlled during the operation, in which the content of that register is processed together with the content of the memory location addressed by the instruction word and the result is retransferred into that accumulator register. For the next operation requiring the accumulator, an accumulator register is available whose address is one count higher or lower than the address of the register employed in the immediately preceding operation. It is thus no longer necessary to transfer the contents of accumulator registers to other memory locations and to erase accumulator registers between successive arithmetic or logic operations. To prevent errors in programming it is advisable to set the computer either for an increase or for a decrease in the accumulator address register for all arithmetic and logic instructions.

With the arrangement according to the present invention there no longer exists the necessity of having to select and address an accumulator register for each arithmetic or logic operation. Thus parts of an instruction word which would be required for the addresses of accumulator registers can be eliminated. This results in shorter word lengths for a computer. For this reason the computer can be constructed along simpler lines and more economically. The same advantages result from the practice of the present invention with reference to a change in the content of the accumulator address register in conjunction with word transfer commands.

The practice of the invention with respect to a change in the content of the accumulator address register as well as of the instruction counter address register can be employed with particular advantage in conjunction with jump orders. This is done in that, during the execution of a jump operation, the content of the accumulator address register and of the instruction counter address register are each reduced, for example, by unity.

In a computer according to the present invention, the use of separate instruction counters and accumulator registers for primary programs on the one hand and secondary programs on the other hand is particularly useful. To avoid errors by simplifying the steps required in the preparation of programs, it is advantageous to provide a separate instruction counter and a separate accumulator register for the secondary program when the secondary program is inserted into a primary program, the addresses of this instruction counter and of the accumulator register being higher by a count of one than the addresses of the last-employed register of the primary program. Upon the occurrence of a jump command in a primary program, the separate instruction counter is selected for the secondary program whereas the content of the instruction counter for the primary program is again increased by a count of one during the performance of the jump command.

Advisably, an instruction is stored at the address contained in the instruction counter of the primary program after execution of the jump command and this instruction assures the further continuation of the primary program upon completion of the secondary program. The utilization of the procedure according to the present invention in conjunction with the execution of a jump command furnishes an instruction which permits a return jump from a secondary program to an address provided for the further continuation of the primary program without this instruction requiring an address indication in that during the execution of the command the content of the instruction counter address and/or of the accumulator address register is reduced by a count of one. At the same time this instruction associates an accumulator register employed in the primary program with the instruction stored at the address of the primary program.

It is also possible, when practicing the present invention in conjunction with the execution of jump commands, to change only the content of the instruction counter address register and to leave the accumulator address register unchanged. This has the result of causing the accumulator register last used during execution of an instruction in the secondary program to be associated with the instruction stored in the primary program at the return jump address. Since the content of the accumulator register is not changed by the jump command, the data remain available for further processing in the accumulator register for the primary program. In this way data parameters are transferred from the secondary program to the primary program.

In a preferred embodiment of the present invention it is additionally provided that, upon an increase in the number contained in the instruction counter address register, the number in the address part of the instruction can be stored in the memory location whose address is present in the instruction counter address register.

The present invention can be practiced to particular advantage in conjunction with the execution of jump commands. If, during the preparation of program instructions for the secondary programs, instruction counter registers and accumulator address registers are selected which contain addresses constituted by numbers which are higher by unity than the instruction counter address of the primary program as well as than the largest address of the accumulator register employed in the primary program, then the jump operations which were modified according to the present invention effect a transfer from a primary program to a secondary program. If this jump operation provides for an increase in the contents of instruction counter address registers an accumulator address registers, no parameters will be transferred from the primary program into the secondary program. If, however, the jump operation provides for an increase only in the content of the instruction counter address register, then an instruction effects not only a jump into a secondary program but also the transfer of a data parameter into the secondary program.

A favorable embodiment of the present invention consists in that, in dependence on a code signal in the command part of the instruction words, the number representing the address part of the instruction words can be written into the instruction counter address register or into the accumulator address register, and the memory for the calculating mechanism overflow can be erased. With this embodiment it is possible to feed a given address into the instruction counter address register.

This measure also permits the selection of a particular accumulator register for a subsequent operation which requires the accumulator. This arrangement can be employed when a certain accumulator register is required for an arithmetic, logic or shift operation.

In a preferred embodiment, the content present before the execution of an instruction in the memory for the calculating mechanism overflow can be incorporated into the calculating result during adding, subtracting or shifting the content of an accumulator register. The present invention permits the use of the bit locations of adjacent accumulator registers for forming a word whose number of bits may correspond, at a maximum, to the sum of the locations of the individual accumulator registers. It is thus possible to produce contiguous words whose number of bits is greater than the locations provided for a single word. In this way results can be determined by addition or subtraction which are greater than the maximum possible number to be fed into the locations of a machine word. This results in the additional advantage that no transfer operations are required for executing such calculations.

In a further preferred embodiment, the calculating mechanism is provided with inputs for a first operand which are connected with the outputs of a memory, and with inputs for a second operand which are connected with he outputs of a memory address register whose one input is in communication with both the output of the calculating mechanism and the input of the memory and whose output is connected to a switch which itself is connected with a memory selector circuit.

With this arrangement, the calculating mechanism is used for arithmetic, logic and shift operations performed on input data as well as for changes in the contents of the instruction counters.

DESCRIPTION OF THE PREFERRED EMBODIMENTS

Figure 1:
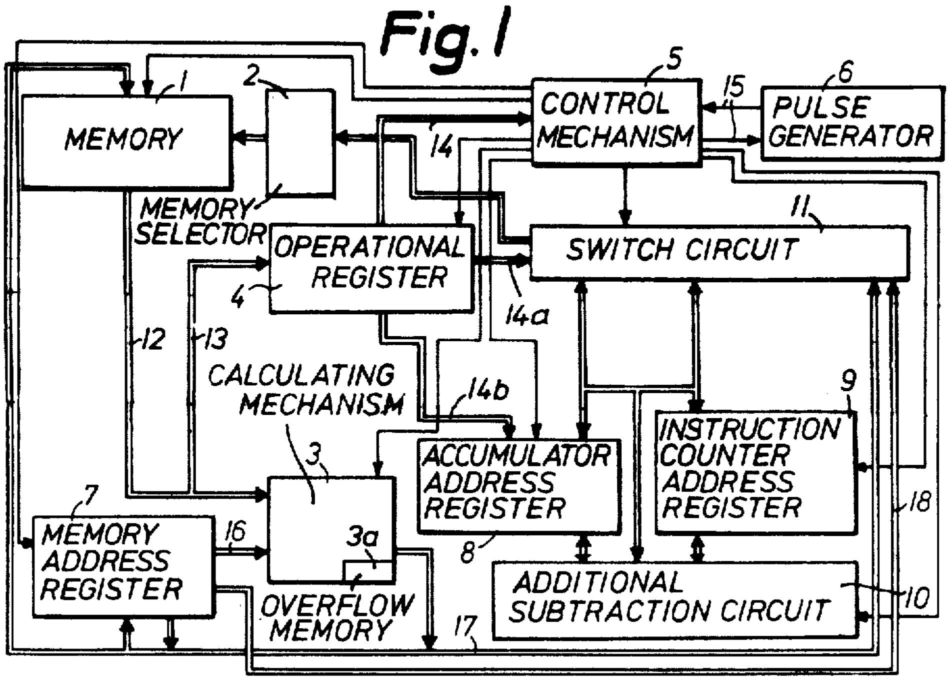
FIG. 1 is a block diagram of one embodiment of the present invention associated with those computer units to which the present invention predominantly pertains.

FIG. 1 shows a computer containing a memory 1, a memory selector circuit 2, a calculating mechanism 3 with an overflow memory 3*a*, an operation register 4, a memory address register 7, an accumulator address register 8, an instruction counter address register 9, an addition/subtraction circuit 10 and a switch 11. The input and output units for the apparatus are not shown.

The outputs of memory 1 are connected via a channel 12 with inputs of the calculating mechanism 3, which inputs are provided for feeding a first operand into the calculating mechanism 3. A branch 13 leads from channel 12 to the operation register 4 which is connected with the control mechanism 5 via a channel 14, with the switch 11 via a channel 14*a*, and with address register 8 via channel 14*b*. The control mechanism 5 is connected for transmission of signals in both directions with clock pulse generator 6 via lines 15. Known circuits for generating different clock pulses and code signals are connected together in the control mechanism 5 and are not shown in detail.

The outputs of the memory address register 7 are connected with inputs of the calculating mechanism 3 via a data channel 16, these inputs being provided for feeding the second operand into the calculating mechanism 3. The outputs of the calculating mechanism 3 are connected to a channel 17 whose lines can be selectively connected to inputs of memory 1, memory address register 7 and switch 11. Further outputs of the memory address register 7 are connected via a channel 18 with inputs of switch 11. The outputs of switch 11 are connected to the inputs of the memory selector circuit 2. The memory selector circuit 2 serves to decode the memory addresses directed to memory 1.

Before describing in detail the circuits shown in FIG. 1, the formats of the instructions shall be discussed in detail. Words, which contain instructions or other data, are stored in memory 1 at respective address locations. The machine shown in FIG. 1 is assumed to be designed, for example, for parallel processing of words each having twelve binary bits. Thus 12 bits are available for a word containing an instruction or other data. If these 12 bits are not sufficient for defining a certain instruction, the twelve bits of the word at the adjacent memory location can also be used for the execution of this instruction.

Figure 2A:
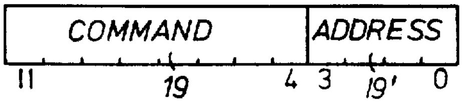
FIGS. 2*a*, 2*b*, 2*c* and 2*d*, are diagrams of exemplary instruction formats.

FIG. 2*a* shows the format for an instruction which serves to designate a portion of memory 1 as an accumulator register or instruction counter. The instruction format contains 12 binary bits eight of which form a command signal 19 indicating the operation to be performed, and four bits form an address signal 19'. The address 19' thus permits the addressing of a maximum of sixteen locations of memory 1, which locations may selectively be defined as the instruction counter or accumulator register.

Figure 2B:
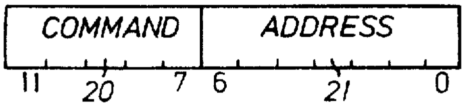

FIG. 2*b* shows the format for arithmetic and logic instructions. The command signal 20 is provided with five binary bit locations and the address signal 21 has seven binary locations.

Figure 2C:
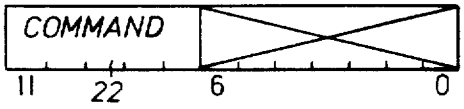
Figure 2D:
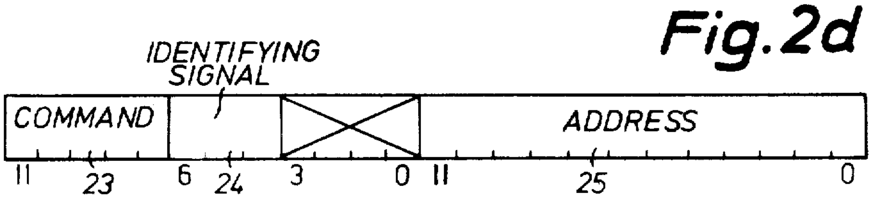

The format according to FIG. 2*c* relates to a jump command for a return jump from a secondary program into a primary program. This command requires only one command signal 22 having five binary bit locations. The remaining seven binary bit locations of the word are not occupied. The format shown in FIG. 2d is composed of two word lengths. The first word contains a command signal 23 occupying five binary bit locations and a 3-bit identifying signal 24 which indicates that the word adjacent to the first word serves as the address signal 25. Such an instruction format is suited for jump commands from a primary program to a secondary program.

Returning now to FIG. 1, at the beginning of an operation, the memory address register 7 contains the address of the memory location in which the instruction to be executed is stored. The command signal of this instruction is transferred from memory 1 into operational register 4.

If the instruction has the format shown in FIG. 2*a*, the content of the address signal 19' is stored either in the accumulator address register 8 or in the instruction counter address register 9. The selection of one of the two registers 8 and 9 by the corresponding command signal 19 depends on whether an accumulator register or an instruction counter is to be established in memory 1. The content of the memory location identified by the address in the instruction counter address register 9 is increased by unity and the resulting number is again transferred to the same memory location. This new signal also is fed into memory address register 7.

Figure 3:
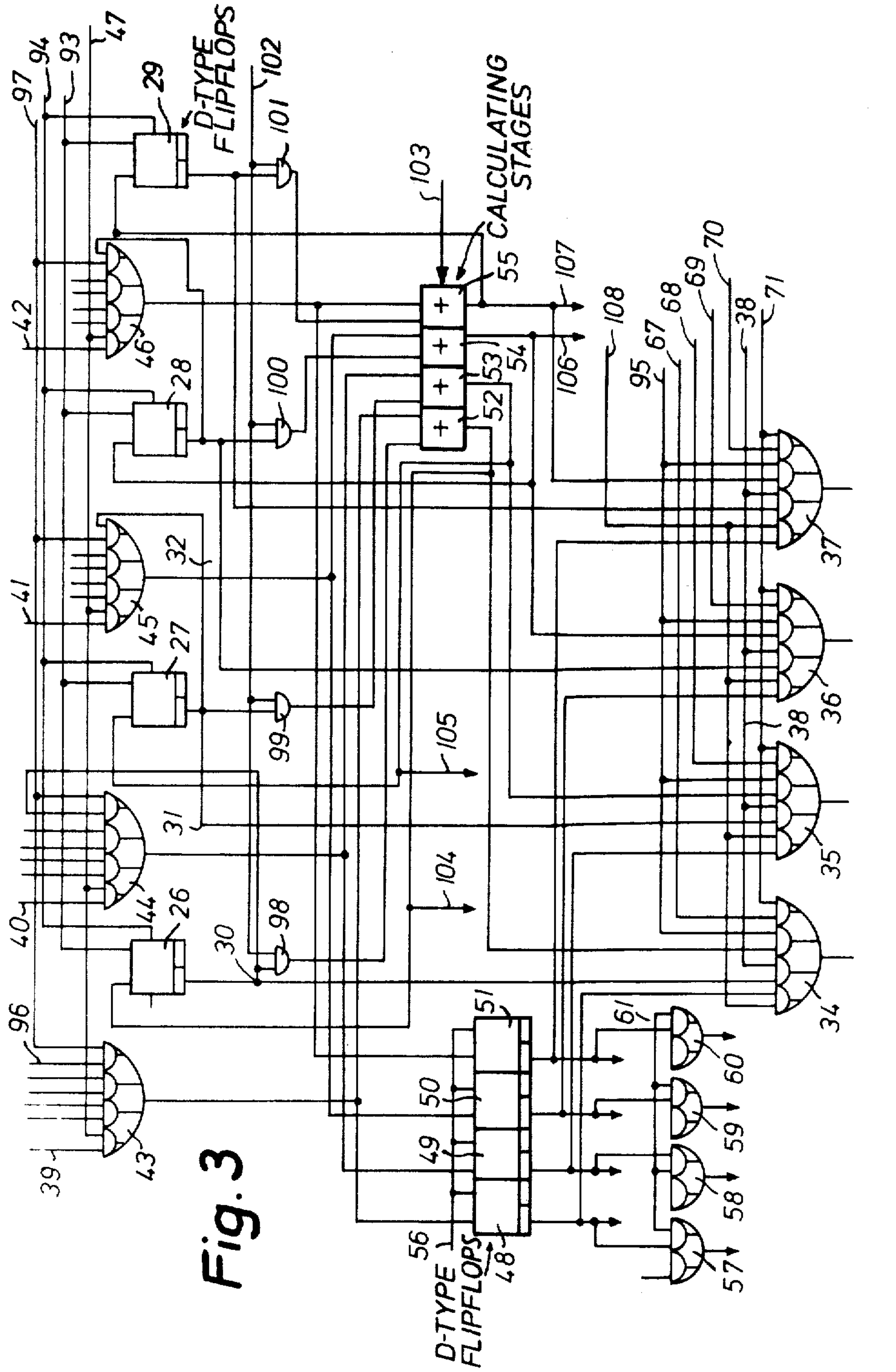
FIG. 3 is a circuit diagram of an embodiment of the invention including a memory address register, calculating mechanism, operation register and memory address switch for the parallel processing of four binary digits.

FIG. 3 shows four memory locations 26, 27, 28, and 29 of the memory address register 7 which serve to hold one bit each, and this figure will be described with reference to the arrangement shown in FIG. 1. D-type flipflops are used in the memory locations. D-type flipflops are disclosed in "The Digital Logic Handbook," 1968 edition on pages 32 and 33.

The outputs of the flipflops 26, 27, 28 and 29 are connected, via lines 30, 31, 32, and 33, respectively, belonging to transfer channel 18, to AND-OR stages 34, 35, 36 and 37 which form part of switch 11. Each AND-OR stage is composed of four AND gates whose outputs are connected as the inputs of a common OR gate. Each one of lines 30 to 33 is connected to one input of an AND gate of a respective one of stages 34–37 and the second input of that gate is connected to a line 38 supplied by control mechanism 5. The outputs of the AND-OR stages 34 to 37 lead to the memory selector circuit 2.

Output lines 39, 40, 41 and 42 of memory 1 are each connected to a respective one of AND-OR stages 43, 44, 45 and 46 identical with stages 34–37. Each line 39 to 42 is connected to one input of an AND gate of its respective one of stages 43 to 46. The second input of each of these AND gates is connected to control mechanism 5 via a common line 47. The outputs of the AND-OR stages 43–46 feed, in parallel connection, the inputs of D-type flipflops 48, 49, 50 and 51 and the inputs for the first operands at stages 52, 53, 54 and 55 of the binary calculating mechanism 3. The flipflops 48–51 are part of the operational register 4. The clock pulse inputs of flipflops 48–51 are connected together to the control mechanism 5 via a line 56.

Figure 4:
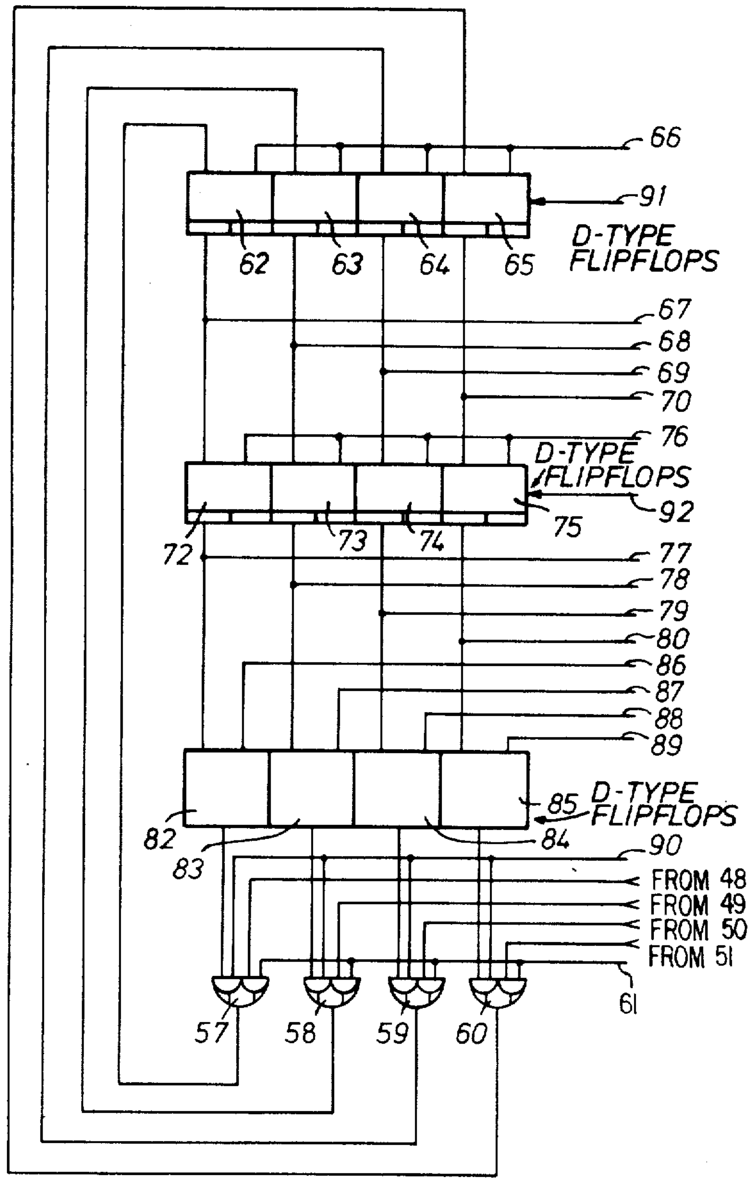
FIG. 4 is a circuit diagram of an embodiment of the invention including an accumulator address register, instruction counter address register and an addition/subtraction circuit.

The output of each of flip-flops 48–51 is connected to an input of an AND gate of a respective one of AND-OR stages 57, 58, 59 and 60, the second input of each of these AND gates being connected to the control mechanism 5 via a common line 61. Stages 57–60 each consist of two AND gates having their outputs connected as inputs of an OR gate. The outputs of the AND-OR stages 57–60 are connected with the inputs of D-type flipflops 62, 63, 64, 65 which form a part of the accumulator address register 8 and which are shown in FIG. 4. Furthermore, the output of each of flipflops 48–51 is connected to one input of an AND gate of a respective one of the AND-OR stages 34–37. The second inputs of these AND gates are controlled by the control mechanism by being connected thereto via a common line 108. The connecting lines between the flipflops 48–51 and the control mechanism 5 are part of channel 14, whereas the connecting lines to the AND-OR stages 34–37 belong to channel **14*a***.

Flipflops 62–65 are shown in FIG. 4. The clock pulse inputs of flipflops 62–65 are together connected to the control mechanism 5 via a line 66. Lines 67, 68, 69, 70 each lead from the output of a respective one of flipflops 62–65 to one input of an AND gate of a respective one of AND-OR stages 34–47. The second inputs of these AND gates are connected to the control mechanism 5 by a common line 71. The output of each of flipflops 62–65 is also connected with one input of a respective one of D-type flipflops 72, 73, 74 and 75 which form a part of the instruction counter address register 9.

The clock pulse inputs of flipflops 72–75 are controlled by control mechanism 5 by being connected thereto via common line 76. The outputs of flipflops 72–75 are connected via respective lines 77, 78, 79 and 80 to indicator circuits (not shown) and to the first operand inputs of respective stages 82, 83, 84 and 85 of the add/subtract circuit 10. The inputs 86, 87, 88 and 89 for the second operand are connected with control mechanism 5. The output of each of stages 82–85 is connected to one input of an AND gate of a respective one of AND-OR stages 57–60. The second input of each such AND gate is connected via a common line 90 to control mechanism 5. All erase inputs of flipflops 62–65 are connected to the control mechanism 5 via a line 91. The erase inputs of flipflops 72–75 are connected together to control mechanism 5 via a line 92.

The clock pulse inputs of flipflops 26–29 are fed via a common line 93 by control mechanism 5 and the erase inputs via a common line 94, also by mechanism 5.

Furthermore, the output of each of stages 52–55 of the binary calculating mechanism 3 is connected to one input of an AND gate of a respective one of the AND-OR stages 34–37. The second inputs of these AND gates are connected to control mechanism 5 via common line 95. The inputs of two AND gates of each of the AND-OR stages 43–46 are connected with input units which are not shown.

One input of a further AND gate of AND-OR stage 46 is connected with the output of flipflop 28. The output of flipflop 27 feeds one input of an AND gate of AND-OR stage 45, while the output of flipflop 26 is connected to an input of one input of an AND gate of AND-OR stage 44. One input of an AND gate of AND-OR stage 43 is in connection, via line 96, with the output of the flipflop (not shown) next to flipflop 26 and part of the total of twelve flipflops of the core memory address register 7. The second input of these AND gates of the AND-OR stages 43–46 is controlled by control mechanism 5 by being connected thereto via the common line 97.

The outputs of flipflops 26–29 are further connected to each feed one input of a respective one of AND gates 98, 99, 100 and 101 which form part of register 7 and whose second inputs are connected to the control mechanism 5 via a common line 102. The output of each of AND gates 98 to 101 is connected with the second operand input of a respective one of stages 52–55, the outputs of these stages being connected to the core memory 1 via lines 104–107 forming part of channel 17. At the same time, the information read-out is again transferred into memory 1 via the output of stages 52–55 and due to a write-in signal for memory 1.

Before executing an instruction, as already mentioned, the address at which the data of the instruction is stored is in memory address register 7. The above-described processes, during the execution of an instruction having the format shown in FIG. 2*a* for reading an address into the accumulator address register 8 take place in detail as follows, referring to FIGS. 1, 3 and 4 together:

The information present at the outputs of flipflops 26–29 of register 7 is transferred to the outputs of the AND-OR stages 34–37 by a signal given by the control mechanism 5 over line 38. The signals at the outputs of the stages 34–37 are decoded in the memory selector circuit 2. By means of the decoded signals and a read-out signal emitted by control mechanism 5, the addressed memory location is read out.

The data corresponding to the content of the memory location appear on lines 39, 40, 41 and 42. Upon the occurrence of a signal from control mechanism 5 to line 47, the data at the inputs 39 to 42 are transferred to the outputs of stages 43 to 46. Then a pulse from control mechanism 5 to line 56 transfers the information present at the outputs of the AND-OR stages 43–46 to flipflops 48–51. Thereafter, the control mechanism 5 sends a pulse to each of lines 66 and 76. During these pulses control mechanism 5 offers the operand value zero via lines 86 to 89 to the inputs of stages 82–85. At the same time a control signal emitted by control mechanism 5 is present in line 90. The pulses on lines 66 and 76 effect the transfer of the contents of flipflops 62–65 into flipflops 72–75. The contents of flipflops 72–75 travel through stages 82–85 where they are summed with an operand of zero, and through the AND-OR stages 57–60 into flipflops 62–65.

The contents of both registers, consisting of flipflops 62–65 and 72–75, respectively, are thus interchanged. After this interchange the address for the accumulator register to be employed in the next operation is present in register 72–75. The address of the instruction counter which determines the next operation, is in flipflops 62–65.

As a next step the control mechanism 5 emits a signal over line 61. The information present at the outputs of memories 48–51 is thus transferred to the outputs of the AND-OR stages 57–60. The signals on lines 61 and 90 are complementary to one another. Thus, upon appearance of an L (binary"1") signal on line 61 the L signal disappears from line 90.

A further pulse to each of lines 66 and 76 effects the transfer of the contents of flipflops 62–65 into flipflops 72–75 and the transfer of the information present at the outputs of the AND-OR gates 57–60 to flipflops 62–65. The register consisting of flipflops 62–65 thus contains the address of the accumulator register cooperating with the calculating mechanism, which address is required for the next operation requiring the accumulator. The address of the instruction counter in which the address of the just executed instruction is contained is present in flipflops 72–75.

The control mechanism 5 then sends a signal to calculating mechanism 3 via a line (not shown). This signal erases overflow memory 3*a*.

In a further step the control mechanism supplies lines 71 and 94 with a control signal while lines 66 and 76 each receive a pulse. Thus the flipflops 26–29 are reset and the contents of flipflops 62–65 and 72–75 are interchanged with one another. Flipflops 62–65 now contain the address for the instruction counter applicable for the present operation. Thereafter, the control mechanism 5 emits a read-out signal to memory 1 over a line not identified. At the outputs of the AND-OR stages 34–37 the address of the instruction counter for the present operation is available. This address is decoded in the memory selector circuit 2. The content of the memory location addressed by circuit 2 reaches lines 39–42 and is transferred, by means of an L signal supplied from the control mechanism 5 to line 47, to the outputs of the AND-OR stages 43–46. At the same time a signal appears on line 103 which causes stages 52–55 to add a one to the operand present at the input. This operand is fed into stages 52–55 from the outputs of the AND-OR stages 43–46. The result of the computation is fed, by means of an L signal on line 93, into flipflops 26–29 and, of a write-in signal, into the memory cells addressed by flipflops 62–65.

For an instruction having the format of FIG. 2*b*, the contents of the memory locations identified by address signals 21 are connected with the content of the accumulator register identified by the address in the accumulator address register 8 and the result is stored in that accumulator register. The content of the instruction counter identified by the address in the instruction counter address register 9 is increased by one. The contents of the accumulator address register 8 is also increased by one. The contents of the memory locations identified by address signals 21 may be connected with the content of the accumulator register by addition with or without consideration of the contents of memory 3*a*, by subtraction with or without consideration of the contents of memory 3*a*, as well as by way of a logic linkage. The above-mentioned processes during the execution of an instruction relating to an addition without consideration of the contents of memory 3*a* is as follows:

Before the execution of an instruction begins, the address of the location at which the data of the instruction are stored is present in memory address register 7, of which a portion of its associated memories, i.e., flipflops 26–29, is shown in FIG. 3.

At the beginning of the instruction a pulse is given from the control mechanism 5 to the lines 66 and 76. At the same time the control mechanism 5 furnishes the operand value zero on lines 86–89. The content of flipflops 72–75 is stored, without increase, in flipflops 62–65 while the content of flipflops 62–65 is transferred to flipflops 72–75. A control signal on lines 38 and 47 and a read-out signal to the core memory cause the control mechanism to read out the content of the address stored in flipflops 26–29. The content of this address is present at the outputs of AND-OR stages 43–46. By means of a clock pulse on line 56, the information present in stages 43–46 is transferred to flipflops 48–51. The information then present in lines 104–107 is retransferred, by means of a write-in signal, to its original location in memory 1. The control mechanism 5 then sends a control signal to line 108 as well as to line 47 and a read-out signal to memory 1. Thus the content of the address present in operation register 4 reaches the outputs of the AND-OR stages 43–46.

Regarding flipflops 48–51, it should be noted that some of the flipflops of the operational register serve to receive the instruction command signal and some serve to receive the address signal. Since for reasons of clarity not all of the flipflops of the operational register 4 are shown in FIG. 3, the flipflops 48–51, for the instruction format of FIG. 2*b*, are intended to receive a part of the address signal 21. The flipflops for receiving the command signal, which are not shown, are provided with the same circuit connections as flipflops 48–51. The AND-OR stages connected with these not illustrated flipflops for receiving the command signal, which are connected in the manner of AND-OR stages connected with these not illustrated flipflops for receiving the command signal, which are connected in the manner of AND-OR stages 34–37, are provided with additional connecting lines to control mechanism 5 which correspond to line 108. As soon as the contents of the flipflops is associated with the command signal, these connecting lines no longer receive control signals from the control mechanism.

The information present at the outputs of the AND-OR stages 43–46 as a result of the above-mentioned process is read into flipflops 26–29 by a clock pulse on line 93. The flipflops 26–29 thus recieve an operand. In the next step the control mechanism 5 sends a control signal to lines 71, 102, and 103 and a read-out signal to memory 1. Thus, the content of the address contained in flipflops 62–65, i.e., the content of the accumulator register, is fed to the stages of the calculating mechanism 52–55 as a first operand and the content of flipflops 26–29 is fed thereto as the second operand, and these are added in the calculating mechanism.

Upon the occurrence of write-in pulse to memory 1, the result of the calculation is retransferred into memory 1. The address of the location to which this transfer is made is given by the content of flipflops 62–65. In the next step, the control mechanism gives a pulse to each of lines 66 and 76 and a signal corresponding to operand value one to lines 86–89. Thus the content of flipflops 72–75 is increased by unity and stored in flipflops 62–65, while the content of flipflops 62–65 is transferred to flipflops 72–75. Thus, register 62–65 contains the address of the instruction counter and register 72–75 contains the new address of the accumulator register.

Simultaneously with the pulse on lines 66 and 76, the control mechanism 5 delivers a clock pulse to line 94. This erases flipflops 26–29. In the next step the control mechanism emits a control signal to line 71, a read-out signal to memory 1, a control signal to line 47 and a control signal to line 103. The content of the address present in flipflops 62–65 is increased by unity and then restored in memory 1 by a write-in signal from control mechanism 5. In the next step the control mechanism 5 delivers a pulse to lines 66 and 76 as well as a clock pulse to line 93. Thus the content of flipflops 62–65 is interchanged with that of flipflops 72–75 and the result at the output of the calculating mechanism 3 is transferred to flipflops 26–29.

A jump command for jumping from a secondary program into a main program without transfer of parameters effects a reduction in the addresses of the instruction counter and the accumulator register by unity. Such a command has the format shown in FIG. 2c and is executed in detail as follows:

Control signals on line 38 and line 47, a read-out signal to the core memory and a clock pulse signal to line 56 cause the content of the address stored in flipflops 26–29 to be stored in flipflops 48–51. With a pulse to each of lines 66 and 76 and a signal corresponding to an operand value of −1 on lines 86–89, the content of flipflops 72–75 is reduced by unity and fed into flipflops 62–65, while the content of flipflops 62–65 is transferred to flipflops 72–75. Flipflops 62–65 thus contain the new address for the instruction counter. Thereafter, the control mechanism 5 sends an erase signal to overflow memory 3a and a signal to line 93 which resets flipflops 26–29.

In the next step, a control signal reaches line 71, a readout signal reaches memory 1, a control signal reaches line 47, a control signal reaches line 103 and a signal reaches line 93. Thus the content of the address contained in register 62–65 is increased by unity and is re-stored, by means of a write-in signal, in memory 1. In the subsequent step, the control mechanism sends pulses on lines 66 and 76 and a signal corresponding to the operand value −1 to lines 86–89. This signal causes the address of an accumulator register to be reduced by unity in the flipflops 62–65 and effects that the new address of the instruction counter is contained in flipflops 72–75.

With an appropriately coded signal it can also be achieved that the increase of the content of the instruction counter by the value one is repeated several times. Such a measure may be desired when instructions or data consist of two words. In order to be able to read the starting address correctly, the content of the instruction counter must then be changed by two. This is done by two increases of the content by unity. An increase of the content by three or four is possible when instructions or data are to comprise a multiple of the basic word length determined for the machine.

A jump command for a jump from a primary program to a secondary program without transfer of a parameter effects an increase in the content of both the instruction counter address register 9 and the accumulator address register 8 by unity. Such an instruction, which has the format shown in FIG. *2d*, is executed as follows:

Signals to lines 38 and 47, a read-out signal to memory 1 and a clock pulse signal to line 56 effect the transfer of the content of the address stored in flipflops 26–29 into flipflops 48–51. The instruction format according to FIG. *2d* is a double word instruction. The control mechanism determines this by decoding the command signal 23. In the next step, control signals on lines 102 and 103 as well as a clock pulse signal on line 95 increase the content of flipflops 28–29 by the value one and apply it as an address to the memory via the memory selector 2. Thereafter, the control mechanism 5 emits signals to line 47, a read-out signal to the memory and a signal to line 93. This effects transfer of the address part 25 of the instruction into flipflops 26–29.

In the next step, a pulse to each of lines 66 and 76 and signals corresponding to the operand value one to lines 86–89 cause the content of flipflops 72–75, increased by unity, to be stored in flipflops 62–65, whose content is transferred to flipflops 72–75. Thus flipflops 62–65 now contain the address of an instruction counter. At the same time overflow memory 3a is erased.

Signals on lines 71 and 102 and a write-in signal to memory 1 cause the content of flipflops 26–29 to be read into the memory location addressed by the new instruction counter address. Finally, signals on lines 66 and 76 and signals corresponding to operand value one on the lines 86–89 cause the content of flipflops 62–65 to be interchanged with those of flipflops 72–75, the content transferred from flipflops 72–75 being increased by unity. Flipflops 62–65 again contain the address of an accumulator register.

A shift command may have the format shown in FIG. *2c*. A shifting to the right operation, with carry, shifts the content of the accumulator register selected by the address in register 8 by one bit location to the right. The content of the accumulator register, a binary number, is thus divided by two. The content of overflow memory 3a increased the length of the word by one bit. With the selected word length of 12 bits the content of the overflow memory corresponds to the 13th bit.

A shift to the right command is executed as follows: the content of the address contained in memory address register 7 is fed into operational register 4. Thereafter, the command signal 22 is decoded and the content of the address stored in register 8 is stored in memory address register 7 whose previous content was erased. Thereafter, the result of the shift is retransferred into memory 1. While the content of that instruction counter addressed by the content of register 9 is increased by unity in a known manner, the content of the accumulator address register 8 is decreased by unity. FIG. 3 shows that the connections required for executing the shift operation lead from the output of flipflops 26, 27, 28 to the inputs of stages 44, 45, 46. The flipflop feeding stage 43 is not included in FIG. 3. Also the stage fed by flipflop 29 is not shown in FIG. 3.

The execution of the shift to the right operation can be derived from the above discussion with the aid of the earlier mentioned control and clock pulse signals which were discussed in detail in connection with the transfer of information between the individual units of the machine.

In the control mechanism 5 there are employed various techniques which have been disclosed in "Arithmetic Operations in Digital Computers," by R.K. Richards, eigth printing Feb. 1960 on pages 337, 338 and 339.

THe multivibrator 6 drives a clock ring 110. Timed pulses are obtained by the stages of the clock ring 110. One complete set of thirteen timed pulses TCO to TC 12 is called one "cycle." The timed pulses from the ring are sent through switching circuits which distribute them to the command lines 38, 71, 95, 47, 56, 61, 66, 67, 93, 94, 97, 91, 92, 102, 108, 86, 87, 88, 89. The transfer of timed pulses TCO to TC 12 to the command lines is controlled by AND gates 111. Input signals to the AND gates are also provided on lines 109 which are connected to switching circuits in the computer. Signals on various lines 109 indicate e.g. whether an instruction cycle or an execution cycle is to be performed.

Additional signals to the AND gates 111 are provided by a matrix 113 which is connected to the operational register 4. In the matrix 113 the instruction stored in the operational register 4 is decoded. Depending on the type of instruction various outputs of the matrix 113 are provided by signals which control the AND gates 111.

If input signals to AND gates 111 are fed by the matrix 113 and input lines 109 a control signal will be present on command line 38 during pulses TCO, TC 1 and TC 4. Command line 71 is connected via AND gates 111 to ten outputs of the clock ring 110. These outputs are assigned to pulses TC 2, TC 3 and TC 5 to TC 12. Depending on the additional input signals to gates 111 on output signal will appear on line 71 at pulses TC 2, TC 3 and TC 5 to TC 12.

Figure 5:
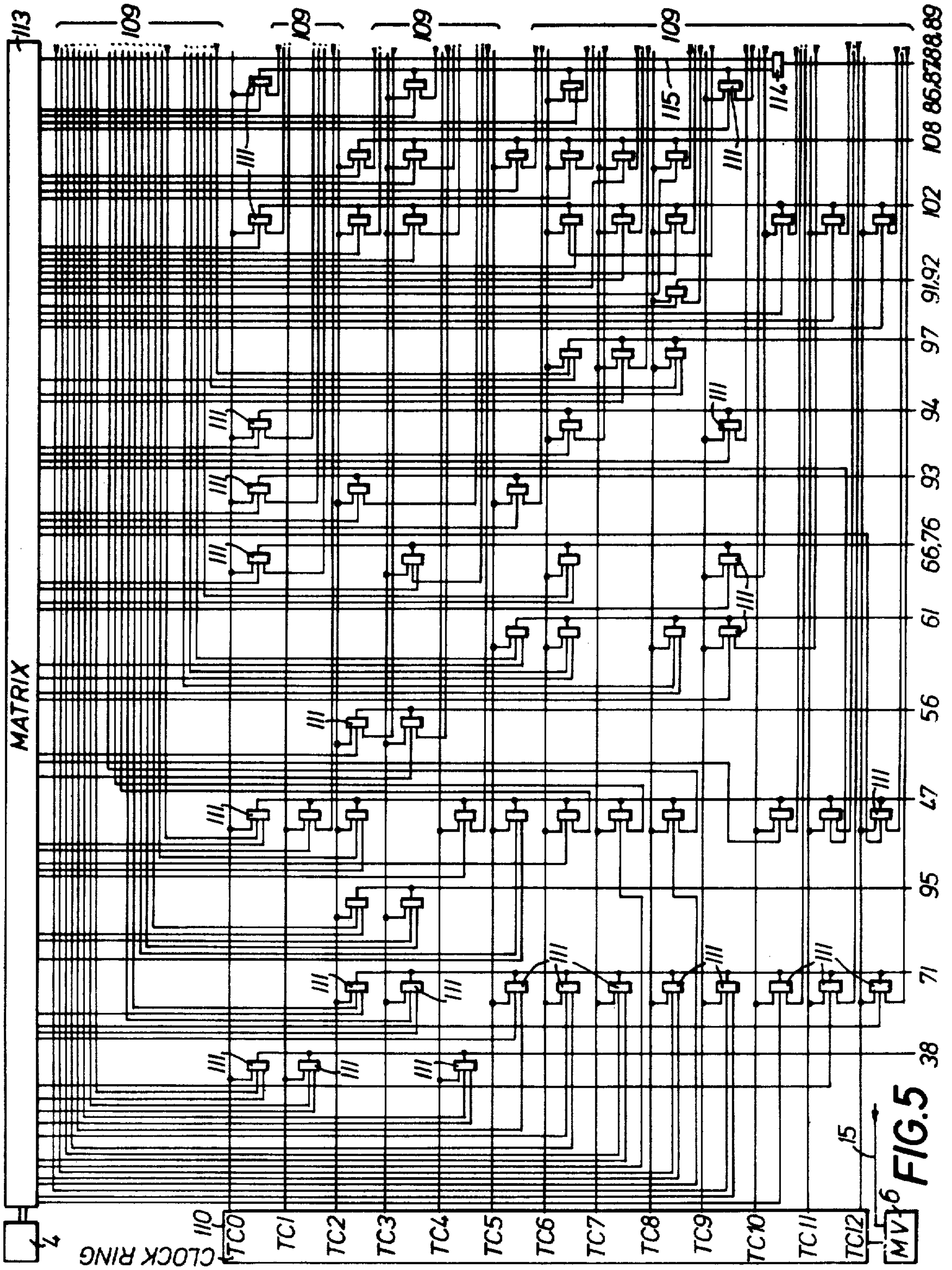
FIG. 5 is a circuit diagram of an embodiment of the control mechanism.

Output signals are obtained on lines 95, 47, 56, 61, 66, 67, 93, 94, 97, 91, 92, 102, 108, 86, 87, 88, 89 at pulses TCO, TC 1, TC 2, etc., if there is a connection via an AND gate 111 to the output stage of clock ring 110 which is assigned to one of the pulses TCO to TC 12. The connections between the command lines and the output stages of clock ring 110 are shown in FIG. 5. Command lines 91, 92 and command lines 86 to 89 are shown each by one single line. Since the signals on line 90 are merely the inverted signals of line 61, line 90 is not shown in FIG. 5.

Relating to the lines 86 to 89 the gates 111 feed an additional AND gate 114 which is connected via lines 115 to the matrix 113. Depending on the instructions stored in the operational register 4 there are signals on lines 115 which correspond to unity or a count of plus or minus one.

The signals on lines 38, 71, 95, 47, 56, 61, 66, 76, 93, 94, 91, 92, 102, 108 and 86 to 89 cause the units shown in FIGS. 1 to 3 to perform in a manner described above on pages 19 to 28.

It will be understood that the above description of the present invention is susceptible to various modifications, changes and adaptations, and the same are intended to be comprehended within the meaning and range of equivalents of the appended claims.

We claim:

1. A control system for use in a computer having a memory storing a series of program instruction words each having a command part and an address part, the memory further including a plurality of memory locations, a first group of the memory locations constituting accumulator registers, and a second group constituting instruction counters, said control system comprising:
   - an accumulator address register operatively connected to the accumulator registers for producing an accumulator register address signal which addresses a selected accumulator register and thus places that register into operation;
   - an instruction counter address register operatively connected to the instruction counters for producing an instruction counter address signal which addresses a selected instruction counter and thus places that counter into operation;
   - a calculating mechanism connected to cooperate with the selected accumulator register and having a result output;
   - means connected to the memory for producing a count signal determined by the command part of a program instruction word; and
   - an addition/subtraction circuit operatively connected to said address registers and connection to receive the count signal for automatically changing by unity the number contained in at least one of said address registers in dependence on the value of the count signal.

2. An arrangement as defined in claim 1 wherein said circuit serves to increase the content of said instruction counter address register, and further comprising means for delivering the address part of the word stored in said instruction counter address register to a memory location identified by that address.

3. An arrangement as defined in claim 2 further comprising write-in means controlled by a signal in the command part of a program instruction word for writing the address part of such word into one of said address registers and for erasing said overflow memory.

4. An arrangement as defined in claim 1 further comprising means for incorporating the previous content of said overflow memory into the result produced during an operation on the content of the presently selected accumulator register.

5. An arrangement as defined in claim 1 further comprising: an operational register composed of a first plurality of flipflops having inputs connected to the memory; a first plurality of gating circuits, the inputs of said gating circuits being connected to the outputs of said flipflops; and a switch circuit composed of a second plurality of gating circuits having inputs connected to the outputs of said first plurality of flipflops; and wherein said accumulator address register comprises a second plurality of flipflops having inputs connected to the outputs of said first plurality of gating circuits and outputs connected to inputs of said second plurality of gating circuits, said instruction counter address register comprises a third plurality of flipflops having inputs connected to the outputs of said second plurality of flipflops, and said addition/subtraction circuit comprises a plurality of stages having a first set of inputs connected to the outputs of said third plurality of flipflops and outputs connected to inputs of said first plurality of gating circuits.

6. An arrangement as defined in claim 5 wherein the flipflops of said second and third pluralities are constituted by D-type flipflops each having a clock pulse input and a reset input, and further comprising control means connected to said inputs.

7. An arrangement as defined in claim 1 wherein the computer further includes a memory selector circuit, connected for addressing the locations of the memory, and further comprising: a switch circuit connected to control the selector circuit; and a memory address register having one set of inputs connected to the result output of said calculating mechanism and to inputs of said switch, and outputs connected to further inputs of said switch circuit, and wherein said calculating mechanism includes first inputs for receiving a first operand from a location of the memory and second inputs for receiving a second operand connected to outputs of said memory address register.

8. An arrangement as defined in claim 1 further comprising a switch circuit connected to be operated only by said accumulator address register, and wherein said accumulator address register is connected to store a selected one of an accumulator register address and an instruction counter address at the same time that said instruction counter address register stores the address other than the selected address.

* * * * *